(No Model.)

G. LINDENTHAL.
CHAIN CABLE.

No. 500,267. Patented June 27, 1893.

WITNESSES:
Danwin S. Wolcott
F. E. Gaither

INVENTOR,
Gustav Lindenthal
by George H. Christy Att'y

THE NORRIS PETERS CO., PHOTO-LITHO., WASHINGTON, D. C.

United States Patent Office.

GUSTAV LINDENTHAL, OF NEW YORK, N. Y.

CHAIN CABLE.

SPECIFICATION forming part of Letters Patent No. 500,267, dated June 27, 1893.

Application filed December 22, 1892. Serial No. 456,007. (No model.)

*To all whom it may concern:*

Be it known that I, GUSTAV LINDENTHAL, a citizen of the United States, residing at New York, in the county of New York and State of New York, have invented or discovered certain new and useful Improvements in Chains, Cables, &c., of which improvements the following is a specification.

Heretofore in constructing suspension bridges having the supporting cables formed of wires, it has been customary to arrange the wires from one anchorage to the other, one at a time and to carefully adjust each wire relative to the others included in the cable in order that each wire or strand of the cable should bear its proper proportion of the load and be under the same tension as the others. Cables for this class of bridge have also been made in the form of chains consisting of eye-bars and connecting pins. While this form of cable is more readily placed in position than the wire cables, its tensile strength for equal cross-sectional areas, is much less than that of the wire cables.

The object of the present invention is to so construct the cables of suspension bridges and the suspensory or tension members of other structures as to combine the tensile strength of wire cables, and the ease of erection of cables composed of eye-bars.

Figure 1:
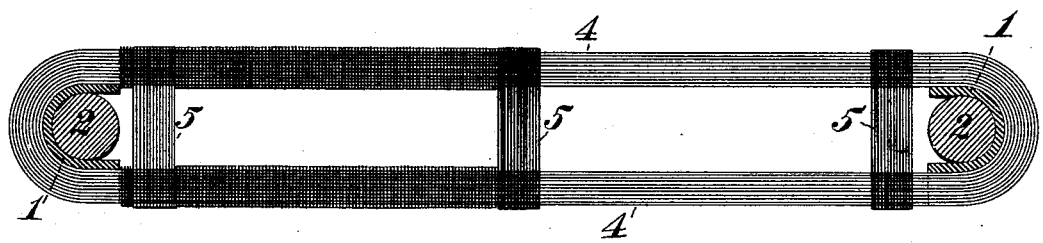
Figure 2:
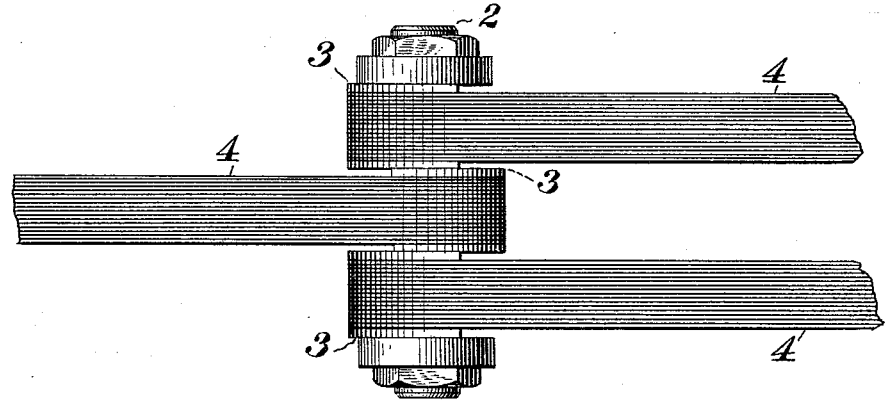
Figure 3:
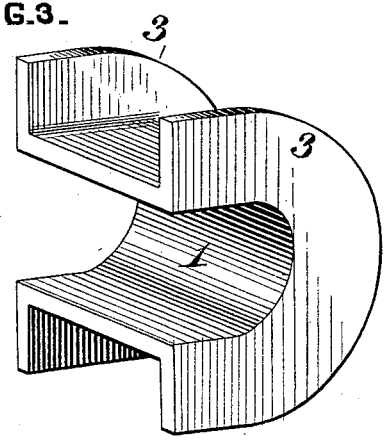

In the accompanying drawings forming a part of this specification, Figure 1 is a view in elevation of a link or section of a cable or chain constructed in accordance with my invention. Fig. 2 is a plan view of a portion of a chain or cable formed of my improved links or sections. Fig. 3 is a perspective view of one of the saddles or bearing plates, and Figs. 4 and 5 are transverse sections of a chain or cable, inclosed within a sheet iron sheath.

In the practice of my invention two saddles 1 are placed a distance apart equal to desired length of link or section, and are preferably secured in such position by shafts or pins 2, over which the saddles may be slipped. These saddles consist of U-shaped plates provided with flanges 3 along their sides to prevent lateral displacement of the wires. The saddle plates are made sufficiently rigid and heavy to prevent their flexure or bending when in use, thereby presenting a uniform unchanging bearing for the wires and the pins employed in connecting the links and pins as hereinafter described. The rigidity of the saddle plates is increased by the flanges formed along their sides. The internal contour of the plates may be round or angular, dependent upon the cross-sectional shape of the pin used in connecting one link or section with another. The saddles being placed in position upon the pins 2, the wire forming the link or section is passed around the saddles, each strand or turn of the wire being properly arranged relative to the others on the saddle. After the desired number of turns have been made, the ends of the wire are secured in any suitable manner. The sides 4 of the link are then served with wire to prevent their displacement during use or transportation, and, in order to prevent the saddles or bearing plates from being dislodged while transporting the links or sections, the latter are wrapped at intervals or continuously with wire as indicated at 5.

Figure 4:
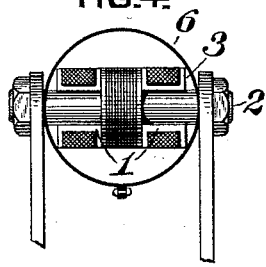
Figure 5:
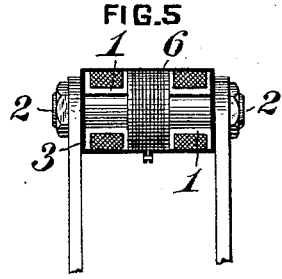

In erecting bridges and other like structures, the links are constructed in the manner above stated preferably on the ground adjacent to the bridge and are then placed in position link by link, adjacent links being connected together by pins 2, as shown in Figs. 2, 4 and 5. The internal shape and dimensions of the saddle plates must be such as to provide a uniform bearing for the pins, which will prevent any collapsing of the plates when the cable or links are subjected to strain. It will be readily understood by those skilled in the art, that, as these links or sections may be constructed on the ground or in any place convenient to the workman, the tension and relative arrangement of the wires can as easily be effected as the manufacture of eye-bars while having a greater tensile strength than such a bar with equal cross-sectional area. These links or sections can be made of any desired length or size and can be substituted for eye-bars as tension members of any structure, and in suspension bridges, chains formed of a series of such links in any desired number and order may be substituted for cables formed of wire strands continuous from one anchorage to the other.

In order to protect the wires of a chain composed of my improved links, they may be surrounded with a metal sheath 6 circular in cross-section, as shown in Fig. 4, or conforming to the cross-sectional contour of the chain as shown in Fig. 5.

I claim herein as my invention—

1. A link having in combination two U-shaped rigid saddle plates, and a series of strands or turns of wire passing around said wires the strands or turns having a practically uniform tension, substantially as set forth.

2. A link having in combination two U-shaped rigid saddle plates provided with flanges along their sides, and a series of strands or turns of wire passing around said saddles and placed under approximately uniform tension, substantially as set forth.

3. In a chain or cable, a series of links each consisting of two U-shaped rigid saddle plates and a series of strands or turns of wire passing around the saddle plates and placed under approximately uniform tension in combination with a series of pins connecting the links, and constructed to fit closely within the saddles and support the same as against collapsing, substantially as set forth.

4. In a chain or cable, a series of links each consisting of two U-shaped rigid saddle plates, and a series of strands or turns of wire passing around the saddle plates and placed under approximately uniform tension in combination with a series of pins connecting the links and constructed to fit closely within the saddles and support the same as against collapsing, and a metal sheath inclosing said chain or cable, substantially as set forth.

In testimony whereof I have hereunto set my hand.

GUSTAV LINDENTHAL.

Witnesses:
WM. H. SEARLES,
M. B. SANFORD.